(12) United States Patent
Bischofberger

(10) Patent No.: US 8,459,228 B2
(45) Date of Patent: Jun. 11, 2013

(54) METHOD FOR THE PRODUCTION OF A PISTON FOR AN INTERNAL COMBUSTION ENGINE AND PISTON FOR AN INTERNAL COMBUSTION ENGINE

(75) Inventor: Ulrich Bischofberger, Esslingen (DE)

(73) Assignee: MAHLE International GmbH, Stuttgart (DE)

( * ) Notice: Subject to any disclaimer, the term of this patent is extended or adjusted under 35 U.S.C. 154(b) by 134 days.

(21) Appl. No.: 13/225,679

(22) Filed: Sep. 6, 2011

(65) Prior Publication Data
US 2013/0014724 A1    Jan. 17, 2013

(30) Foreign Application Priority Data
Jul. 12, 2011    (DE) .......................... 10 2011 107 656

(51) Int. Cl.
*F02F 3/00*    (2006.01)

(52) U.S. Cl.
USPC .................................. 123/193.6; 29/888.043

(58) Field of Classification Search
USPC .................. 29/888.042–888.048; 123/193.6, 123/41.3; 92/222
See application file for complete search history.

(56) References Cited

U.S. PATENT DOCUMENTS

| | | | | |
|---|---|---|---|---|
| 3,914,574 | A | * | 10/1975 | Hill et al. ................. 219/121.14 |
| 4,553,472 | A | * | 11/1985 | Munro et al. .................... 92/176 |
| 4,746,582 | A | * | 5/1988 | Tsuno ........................... 428/627 |
| 4,838,149 | A | * | 6/1989 | Donnison et al. ............... 92/222 |

FOREIGN PATENT DOCUMENTS

DE        30 32 671        3/1982

* cited by examiner

*Primary Examiner* — M. McMahon
(74) *Attorney, Agent, or Firm* — Collard & Roe, P.C.

(57) ABSTRACT

A method for the production of a piston for an internal combustion engine, composed of at least two components, each of which has at least one corresponding joining surface, has the following steps: a) pre-working the at least two components, at least in the region of the joining surfaces; b) coating at least a part of the surface of at least one component with a covering medium containing at least one phyllosilicate; c) assembling the at least two components; d) connecting the at least two components along their corresponding joining surfaces, by means of beam welding, to produce a piston blank; e) removing the covering medium and any excess weld material adhering to it; and f) machining the piston blank to produce a finished piston.

12 Claims, 5 Drawing Sheets

METHOD FOR THE PRODUCTION OF A PISTON FOR AN INTERNAL COMBUSTION ENGINE AND PISTON FOR AN INTERNAL COMBUSTION ENGINE

CROSS REFERENCE TO RELATED APPLICATIONS

Applicant claims priority under 35 U.S.C. §119 of German Application No. 10 2011 107 656.9 filed Jul. 12, 2011, the disclosure of which is incorporated by reference.

BACKGROUND OF THE INVENTION

1. Field of the Invention

The present invention relates to a method for the production of a piston for an internal combustion engine, composed of at least two components, each of which has at least one corresponding joining surface. The present invention furthermore relates to a piston that can be produced using such a method.

2. The Prior Art

In beam welding, excess weld material regularly occurs, generally in the form of weld beads or weld splashes. In the following, the term "weld beads" is used to refer to all forms of excess weld material.

In the production of a piston by beam welding, there is the risk that weld beads adhere to the piston. It is particularly disadvantageous if the weld beads get into the cooling channel and take hold there. During engine operation, the weld beads can come loose again and enter the cooling oil and thus enter into the cooling oil circuit and the lubrication oil circuit. In this case, the internal combustion engine would suffer irreparable harm.

SUMMARY OF THE INVENTION

It is therefore an object of the present invention to provide a method for the production of a piston that prevents the exit of weld beads into the oil circuit during engine operation.

This object is achieved by a method having the following steps:

a) pre-working the components, at least in the region of the joining surfaces;

b) covering at least a part of the surface of at least one component with a covering medium containing at least one phyllosilicate;

c) assembling the components;

d) connecting the components along their corresponding joining surfaces, by means of beam welding, to produce a piston blank;

e) removing the covering medium and any excess weld material adhering to it; and f) machining the piston to finish it.

The object of the present invention is furthermore a piston for an internal combustion engine that can be produced according to the method according to the invention and thus, in the end result, has at least two components connected with one another by means of beam welding and, at the same time, is free of weld material adhering to them.

Using the method according to the invention, when the at least two components are connected, weld beads due to the beam welding do not remain adhered to the components. In particular, walls of a cooling channel that might be present can be kept free of weld beads. The weld beads either remain adhered to the covering medium or do not adhere at all. The covering medium is removed from the components again after beam welding. In the end result, a beam-welded piston is obtained that is free of weld beads.

The weld beads do not occur with the same frequency or thickness everywhere. For example, the weld beads occur more frequently in those zones of the components that lie opposite the weld seams. These regions are supposed to be particularly protected.

The known pre-working of the components to be connected also includes cleaning and degreasing, in order to obtain a firm weld seam in step d).

Preferably, bentonite is used in step b); this is a stone material that contains montmorillonite, a clay mineral from the class of phyllosilicates, as its major component. Bentonite has the advantage that it behaves in thixotropic manner, in other words it can be applied easily and then solidifies.

The covering medium can furthermore contain disodium tetraborate (borax). Borax is soluble in water, acts as a binder or flux agent, and thereby contributes to allowing the covering medium to be particularly easily removed by washing with warm or cold water, after the welding process. Borax is generally very fine-grained, with a particle diameter of less than 1 μm, and, because of its layer-like crystal structure and its low Mohs hardness of 2 to 2.5, does not have any abrasive properties, so that the risk of damage to the internal combustion engine during engine operation is further reduced. Borax furthermore withstands temperatures above 500° C. and does not enter into any reaction with the material of the components to be connected.

It is practical if, in step b), the covering medium is applied removed at least 1 mm from the edge of each joining surface, in order to prevent it from being damaged during beam welding or from impairing the quality, particularly the strength, of the weld seam. The joining surfaces themselves remain metallically shiny and uncoated.

The covering medium is preferably applied, in step b), in the form of a suspension, which is preferably based on water. In this form, the covering medium can be applied particularly easily, for example by brushing it on, spraying it on, rolling it on, or imprinting it. It is practical if the coated components are dried, after step b), by heating them to 80° C. to 180° C.

In step b), the covering medium can also be applied to the coated components in the form of a powder, by means of thermal spraying. A covering medium that contains disodium tetraborate is particularly well suited for this, because disodium tetraborate loses its water of crystallization at temperatures above 400° C., and its melting point in the anhydrous phase amounts to 848° C. This melt serves as a carrier for the at least one phyllosilicate.

The covering medium should be applied with a layer thickness of at least 100 μm, in order to guarantee effective protection of the at least one component and to reliably prevent weld beads from remaining adhering to the surface of the at least one component.

The components to be coated with the covering medium can be preheated to 50° C. to 80° C. before the covering medium is applied, in order to guarantee good adhesion of the covering medium.

In step e), the covering medium, together with the weld beads adhering to it if applicable, is removed from the piston blank, particularly preferably by means of washing it with warm or cold water. This is particularly practical if the covering medium contains disodium tetraborate. Borax is water-soluble in every form (11 g/l at 20° C. and 88 g/l at 80° C.), so that the complete coating, together with the phyllosilicate distributed in it, and, if applicable, together with the weld material adhering to the coating, is removed from the piston blank without leaving any residue.

The at least two components to be connected can be tacked together before beam welding. Furthermore, at least one component can be shrunk-fit onto another component. In this way, the components are fixed in place relative to one another, in terms of their position.

The at least two components can be connected by means of electron beam welding or laser welding. The use of a $CO_2$ laser is preferred, because comparatively small amounts of weld beads are formed with it.

Before beam welding, the components to be connected can be preheated to 400° C. to 550° C., in known manner, in order to obtain a particularly strong and reliable weld connection and to avoid cracks.

It is practical to protect the piston blank against corrosion, in known manner, after removal of the covering medium and, if applicable, after the drying process.

The piston blank should furthermore be inspected for complete removal of weld beads. The inspection of a cooling channel that might be present can be undertaken using an endoscope, for example.

The machine finishing of the piston blank comprises a heat post-treatment known to a person skilled in the art, depending on the material used for the components.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
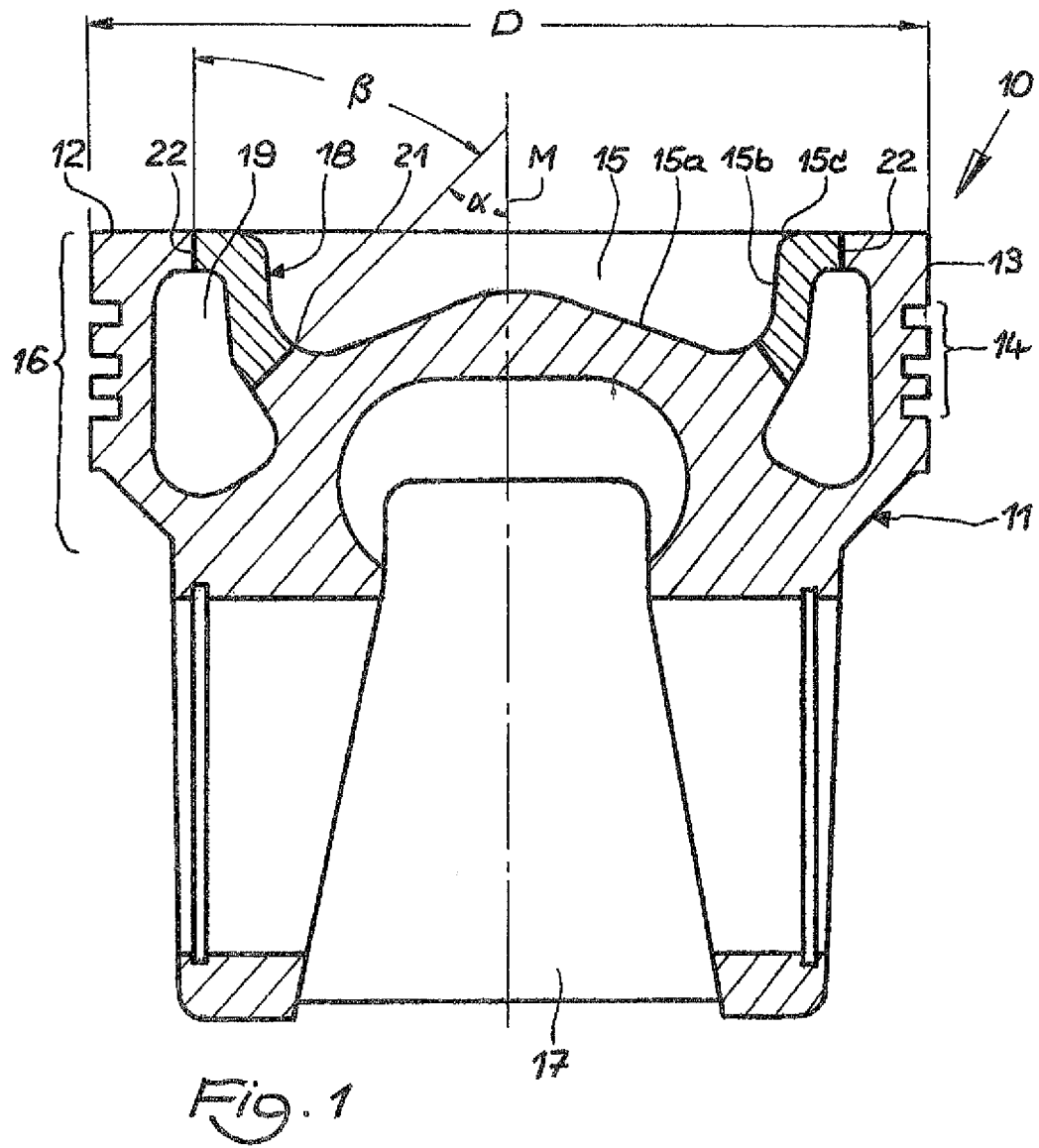
FIG. 1 shows a first embodiment of a piston according to the invention, in section.

Referring now in detail to the drawings, FIG. 1 shows a first embodiment of a piston 10 according to the invention. Piston 10 has a component 11 configured as a piston base body, which is produced, for example, from an annealed steel such as 42CrMo4 or an AFP steel such as 38MnSiVS6, for example, or a bainitic AFP steel alloyed with 0.4 wt.-% molybdenum. Component 11 has a part of a piston crown 12, a circumferential top land 13, as well as a circumferential ring belt 14 having ring grooves for accommodating piston rings (not shown). Component 11 furthermore has the bottom 15a of a combustion bowl 15. Component 11 thus forms an essential part of piston head 16 of piston 10. Component 11 furthermore forms piston skirt 17 of piston 10 according to the invention, in known manner.

The piston according to the invention furthermore has a component 18 configured as an insert that forms the entire bowl wall 15b as well as the bowl edge region 15c of combustion bowl 15, and furthermore part of piston crown 12.

Component 18 preferably consists of a particularly high-strength material. For this purpose, an annealed steel or AFP steel can be used for piston base body 11. Furthermore, a steel that is resistant to high elevated temperatures, corrosion-resistant, and heat-resistant is suitable. Valve steels such as, for example, CrSi steel (X45CrSi93), Chromo193 steel (X85CrMoV182), 21-4 N steel (X53CrMnNiN219), 21-2 steel (X55CrMnNiN208), and materials such as Nimonic80A (NiCr20TiAl), ResisTEL, or VMS-513 are particularly suitable.

Components 11, 18 form a circumferential outer cooling channel 19. Cooling channel 19 runs at the level of ring belt 14, and at the level of bowl wall 15b of combustion bowl 15.

Component 18 has a lower circumferential joining surface 24a (see FIG. 4) that forms a lower weld seam 21 with a circumferential joining surface 23a (see FIG. 4) on component 11 that encloses bottom 15a of the combustion bowl 15. Lower weld seam 21 has a length of 3.5% to 5.5% of piston diameter D, and encloses an acute angle a with the piston center axis M. Lower weld seam 21 therefore runs radially toward the outside, proceeding from the bowl wall 15b, and downward (in the direction of the piston skirt 17), and ends in cooling channel 19, in the region of the cooling channel bottom.

Component 18 furthermore has an upper circumferential joining surface 24b (see FIG. 4) that forms an upper weld seam 22 with a circumferential joining surface 23b (see FIG. 4) on component 11, in the region of top land 13. Upper weld seam 22 has a length of 4.5% to 6.0% of piston diameter D. Upper weld seam 22 runs from the cooling channel ceiling to the piston crown 12 and parallel to piston center axis M, and encloses an acute angle β with lower weld seam 21.

Lower weld seam 21 and upper weld seam 22 are produced by beam welding and are disposed in such a manner that they are accessible to a tool for beam welding. During beam welding, excess weld material enters cooling channel 19, for example in the form of weld splashes, and usually collects, for example in the form of weld beads, in a region of cooling channel 19 that lies opposite weld seams 21, 22.

Figure 2:
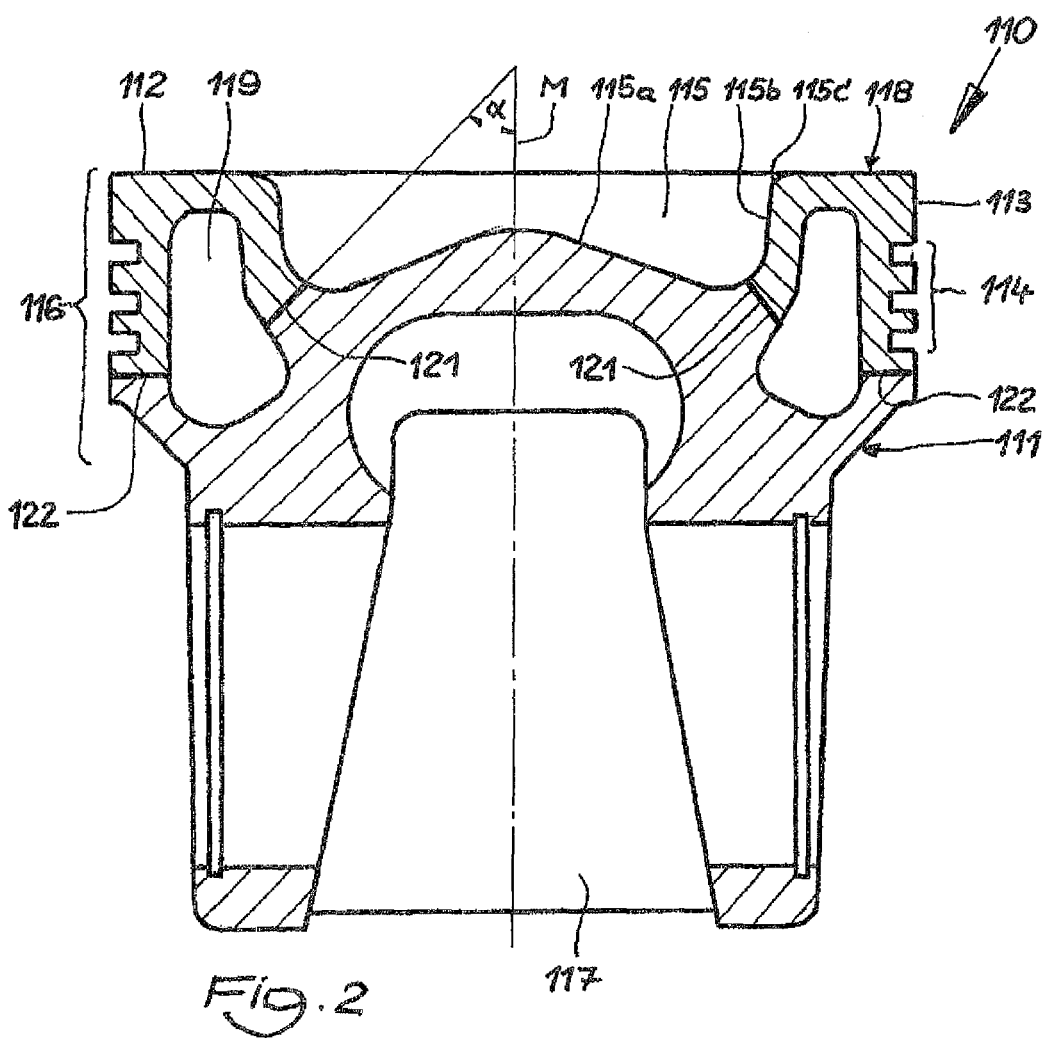
FIG. 2 shows another embodiment of a piston according to the invention, in section.

FIG. 2 shows another embodiment of a piston 110 according to the invention. Piston 110 has a component 111 configured as a piston base body, which can consist of a material such as that described for component 11 according to FIG. 1, for example. Component 111 has a bottom 115a of a combustion bowl 115. Component 111 furthermore forms piston skirt 117 of piston 110 according to the invention, in known manner.

Piston 110 according to the invention furthermore has a component 118 that forms the entire bowl wall 115b as well as bowl edge region 115c of combustion bowl 115, and furthermore piston crown 112, top land 113, and ring belt 114, in the embodiment shown. Component 118 preferably consists of a particularly high-strength material, such as that described for component 18 according to FIG. 1.

Components 111, 118 form a circumferential outer cooling channel 119. Cooling channel 119 runs at the level of the ring belt 114, and at the level of bowl wall 115b of combustion bowl 115.

Component 118 has an inner circumferential joining surface that forms an inner weld seam 121 with a circumferential joining surface on component 111, which surface encloses bottom 115a of combustion bowl 115. Inner weld seam 121 has a length of 3.5% to 5.5% of piston diameter D, and encloses an acute angle with the piston center axis M. Inner weld seam 121 therefore runs radially toward the outside, proceeding from bowl wall 115b, and downward (in the direction of the piston skirt 117), and ends in cooling channel 119, in a region of the cooling channel bottom.

Component 118 furthermore has an outer circumferential joining surface that forms an outer weld seam 122 with a circumferential joining surface 111 below ring belt 114.

Inner weld seam 121 and outer weld seam 122 are produced by beam welding and are disposed in such a manner that they are accessible to a tool for beam welding. During beam welding, excess weld material enters cooling channel 119, for example in the form of weld splashes, and preferentially collects, for example in the form of weld beads, in a region of cooling channel 119 that lies opposite weld seams 121, 122.

Figure 3:
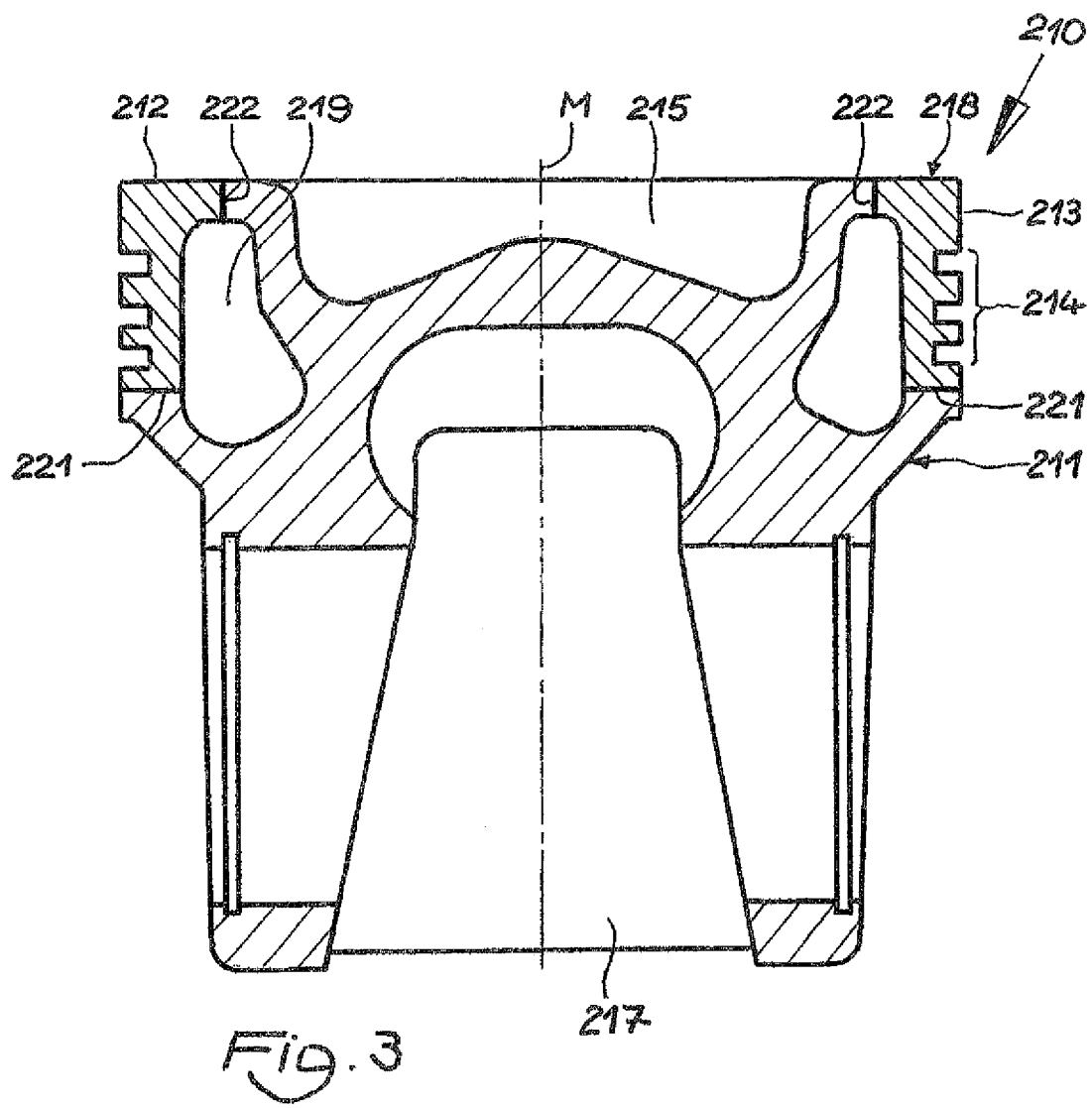
FIG. 3 shows another embodiment of a piston according to the invention, in section.

FIG. 3 shows another exemplary embodiment of a piston 210 according to the invention. Piston 210 has a component 211 configured as a piston base body, which is produced from a material such as that described for component 11 according to FIG. 1, for example. Component 211 has a part of piston crown 212 as well as a combustion bowl 215. Component 211 furthermore forms piston skirt 217 of piston 210 according to the invention, in known manner.

The piston according to the invention furthermore has a component 218, configured in ring shape, that forms part of piston crown 212, a circumferential top land 213, as well as a circumferential ring belt 214 having ring grooves for accommodating piston rings (not shown). Component 218 preferably consists of a particularly high-strength material, such as that already described for component 18.

Components 211, 218 form a circumferential outer cooling channel 219. Cooling channel 219 runs at the level of ring belt 214, on the one hand, and at the level of the bowl wall of combustion bowl 215, on the other hand.

Component 218 has a lower circumferential joining surface below ring belt 214, that forms a lower weld seam 221 with a lower circumferential joining surface on component 211. Component 218 furthermore has an upper circumferential joining surface in the region of top land 213, which surface forms an upper weld seam 222 with an upper circumferential joining surface in the region of the combustion bowl 215 on component 211. Upper weld seam 222 runs from the cooling channel ceiling to piston crown 212, as well as parallel to piston center axis M.

Lower weld seam 221 and upper weld seam 222 are produced by beam welding and are disposed in such a manner that they are accessible to a tool for beam welding. During beam welding, excess weld material enters cooling channel 219, for example in the form of weld splashes, and preferentially collects, for example in the form of weld beads, in a region of cooling channel 219 that lies opposite weld seams 221, 222.

Figure 4:
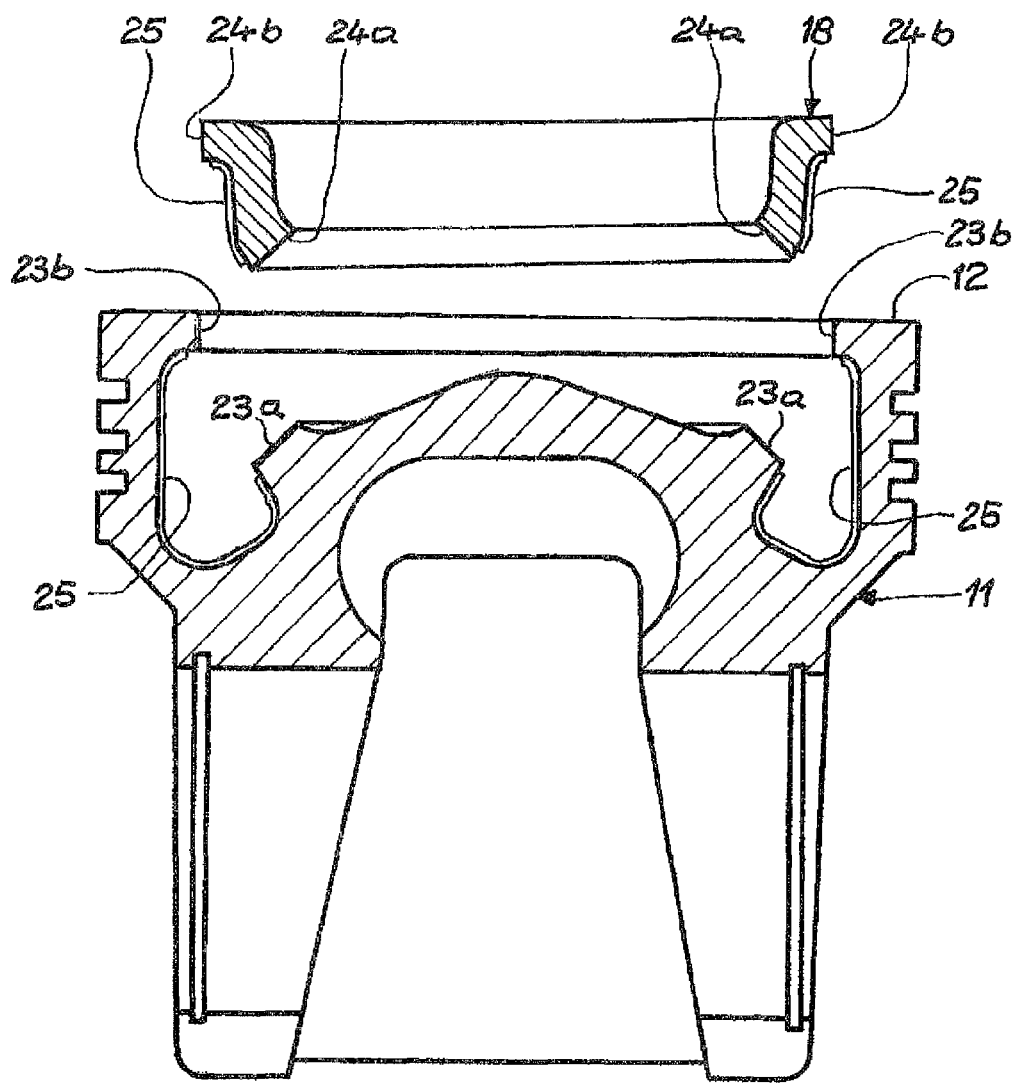
FIG. 4 shows an exploded view of the embodiment according to FIG. 1, before the components to be connected are assembled.

An exemplary embodiment of the method according to the invention, for production of a piston according to the invention, for example piston 10, 110, 210, will be described in greater detail in the following, using a piston 10 according to FIG. 1 as well as using FIGS. 4 and 5. Of course, the method described in the following applies analogously for the production of the pistons 110, 210 according to FIGS. 2 and 3, respectively.

First, components 11, 18 to be connected are pre-worked. In particular, circumferential joining surfaces 23a, 23b of component 11 as well as corresponding circumferential joining surfaces 24a, 24b of component 18, the regions of cooling channel 19 (see FIG. 5), piston crown 12, and the outer contour are pre-lathed. If necessary, a one-pass can be lathed in, in order to securely fix in place components 11, 18 that are to be connected, against one another. Making available cleanly lathed joining surfaces 23a, 23b; 24a, 24b as well as inner and outer contours serves to prepare for weld seams 21, 22 (see FIG. 5), in order to obtain a firm and reliable weld connection. Furthermore, joining surfaces 23a, 23b; 24a, 24b should be cleaned and degreased, for example with acetone.

Figure 5:
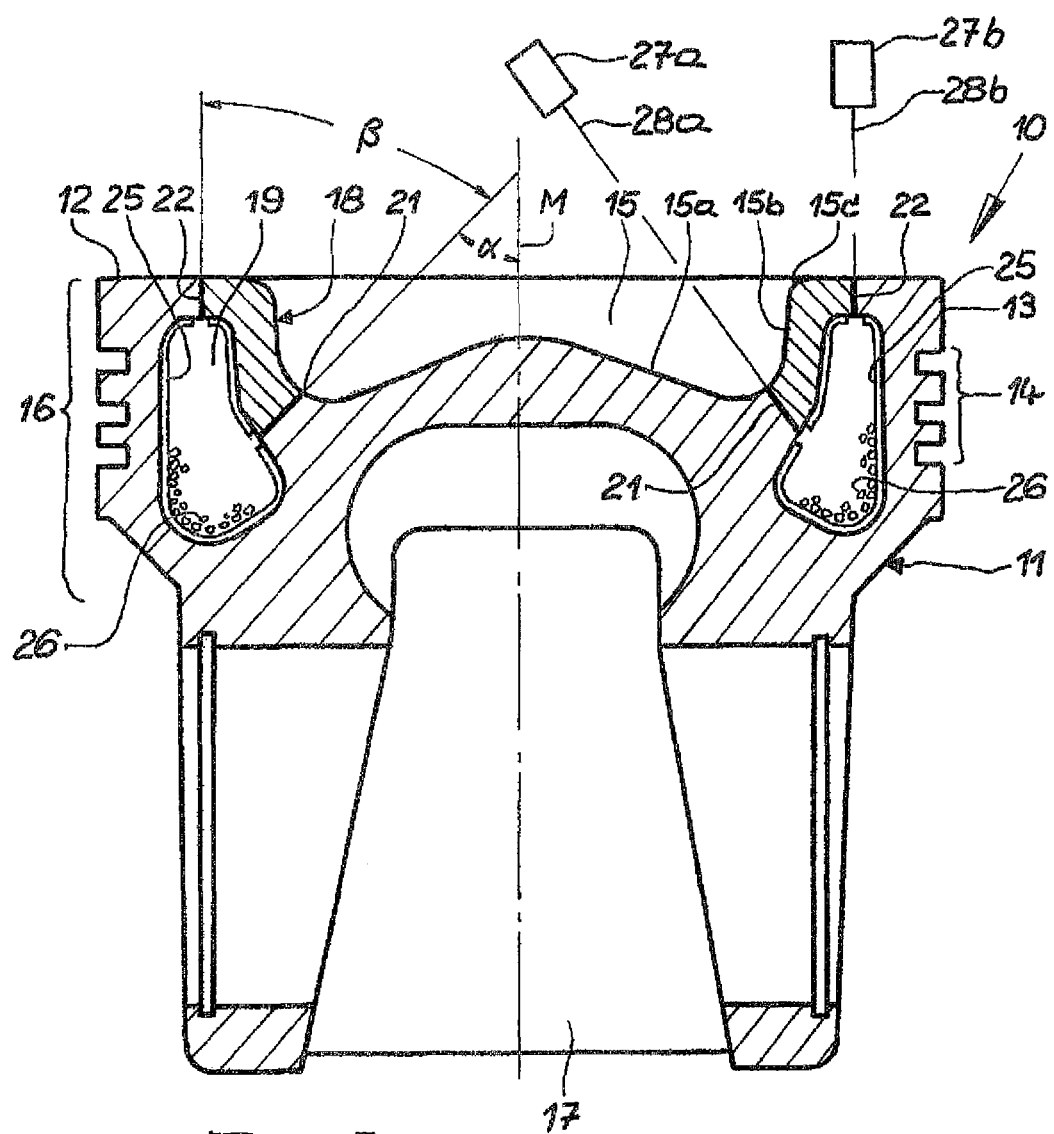
FIG. 5 shows the embodiment according to FIG. 1 after beam welding.

In the embodiments shown in FIGS. 1 to 3, covering medium 25 provided according to the invention is applied in the region of cooling channel 19, because the joining surfaces 23a, 23b; 24a, 24b are positioned in such a manner that weld beads 26 enter into the region of cooling channel 19 during the welding process (see FIG. 5). Covering medium 25 should be applied so that it is removed from each edge of joining surfaces 23a, 23b; 24a, 24b at a distance of at least 1 mm, so that it is not damaged during the later welding process, and that the quality, particularly the strength, of weld seams 21, 22 (see FIG. 5) is not impaired. Covering medium 25 can be applied in thickened form in those regions that lie opposite joining surfaces 23a, 23b; 24a, 24b, because the most weld beads impact in these regions during the subsequent welding process.

The components to be connected can be preheated to 50° C. to 80° C., in advance, in order to achieve good adhesion of covering medium 25 on the components.

For the production of the covering medium provided according to the invention, 50 g to 100 g bentonite as well as 5 g to 10 g borax (Na2[B4O5(OH)4])×8 H2O) are dissolved in 100 ml hot water and stirred intensively for about 10 min. The resulting aqueous suspension is applied to the components to be coated, in the region of cooling channel 19, as a closed layer having a layer thickness of 100 μm, by means of a conventional paint spray gun. The resulting coating is subsequently dried at room temperature. Joining surfaces 23a, 23b; 24a, 24b are not coated.

After application of covering medium 25, component 18 is shrunk-fit onto component 11 in known manner, in that component 11 is heated to 180° C. to 200° C., component 18 is set on, and component 11 is subsequently cooled. Shrink-fitting should take place without a gap, as much as possible, in other words joining surfaces 23a, 23b; 24a, 24b should lie firm and flat on one another, so that during the later welding process, smooth, firm weld seams 21, 22 are obtained. In addition, components 11, 18 to be connected can be tacked together along their joining surfaces 23a, 23b; 24a, 24b, at points or circumferentially, at a low welding depth.

Components 11, 18 are connected by means of laser welding, using at least one commercially available $CO_2$ laser 27a, 27b. For this purpose, the components are heated, in advance, to 400° C. to 550° C. In this connection, the borax contained in covering medium 25 loses its water of crystallization and makes a transition into the anhydrous form $Na_2B_4O_7$. Aside from this, covering medium 25 remains stable at these temperatures.

When using a $CO_2$ laser 27a, 27b, particularly few weld beads 26 occur. Of course, other lasers, such as solid body lasers, are also suitable. Components 11, 18 can also be connected with one another by electron beam welding. The required power of the welding tool is dependent on the materials used for components 11, 18 and the length of weld seams 21, 22 to be formed. The required parameters can be set in known manner by a person skilled in the art. No additional welding material is required.

Joining surfaces 23a, 23b; 24a, 24b should be laid in such a manner that weld seams 21, 22 in finished piston 10 are disposed in those regions in which as little stress as possible occurs during engine operation, in order to reduce the risk of crack formation in the region of weld seams 21, 22. Of course, joining surfaces 23a, 23b; 24a, 24b must also be laid in such a manner that they are accessible for the weld beams, which are the laser beams 28*a*, 28*b*. The position of joining surfaces 23*a*, 23*b*; 24*a*, 24*b* therefore generally represents a compromise between the stability of the finished piston 10 and the requirements of the production method. Slanted joining surfaces 23*a*, 24*a* and weld seams 21, 22, respectively, automatically center components 11, 18 relative to one another, in known manner.

Corresponding deliberations apply analogously, of course, also for pistons 110, 210 according to FIGS. 2 and 3, respectively.

In the exemplary embodiment, component 18 was laser-welded to component 11 by means two $CO_2$ lasers 27*a*, 27*b*, using two butt seams 21, 22.

After the welding process, covering medium 25, together with the weld beads adhering to it, is removed from the resulting piston blank 10'. For this purpose, cooling channel 19 is washed with warm water. In this connection, the anhydrous disodium tetraborate $Na_2B_4O_7$ dissolves in the water, so that the bentonite is slurried up again and washed out together with the weld beads that might be present. Washing is continued until only clear water exits from piston blank 10'.

Subsequently, piston blank 10' is dried and immediately protected against corrosion. It is subsequently recommended to inspect cooling channel 19 by means of an endoscope, to check for complete removal of the weld beads.

The piston blank is finally machined, in known manner, to produce finished piston 10, 110, 210. This includes, depending on the materials used, a heat post-treatment known to a person skilled in the art. Thus, a piston is achieved that lacks any excess weld material.

Accordingly, while only a few embodiments of the present invention have been shown and described, it is obvious that many changes and modifications may be made thereunto without departing from the spirit and scope of the invention.

What is claimed is:

1. A method for the production of a piston for an internal combustion engine, composed of at least two components, each of said components having at least one corresponding joining surface, comprising the following method steps:
    a) pre-working the at least two components, at least in a region of the joining surfaces;
    b) coating at least a part of a surface of at least one of the components with a covering medium containing at least one phyllosilicate as well as disodium tetraborate;
    c) assembling the at least two components together;
    d) connecting the at least two components along their corresponding joining surfaces, by means of beam welding, to produce a piston blank;
    e) removing the covering medium and any excess weld material adhering to the covering medium from the piston blank; and
    f) machining the piston blank to produce a finished piston.

2. The method according to claim 1, wherein bentonite is used in step b).

3. The method according to claim 1, wherein the covering medium contains disodium tetraborate.

4. The method according to claim 1, wherein in step b), the covering medium is applied at least 1 mm removed from an edge of each joining surface.

5. The method according to claim 1, wherein in step b), the covering medium is applied in the form of a suspension.

6. The method according to claim 5, wherein an aqueous suspension is used.

7. The method according to claim 5, wherein after step b), the coated components are dried by being heated to 80° C. to 180° C.

8. The method according to claim 1, wherein in step b), the covering medium is thermally sprayed in the form of a powder.

9. The method according to claim 1, wherein in step b), the covering medium is applied in a layer thickness of at least 100 μm.

10. The method according to claim 1, wherein before step b), the components to be coated are preheated to 50° C. to 80° C.

11. The method according to claim 1, wherein in step e), the covering medium is removed by washing with warm or cold water.

12. A piston for an internal combustion engine produced by means of a method according to claim 1.

* * * * *